Sept. 16, 1947.  E. C. SEDORE  2,427,575
MANURE LOADER
Filed July 13, 1945  2 Sheets-Sheet 1
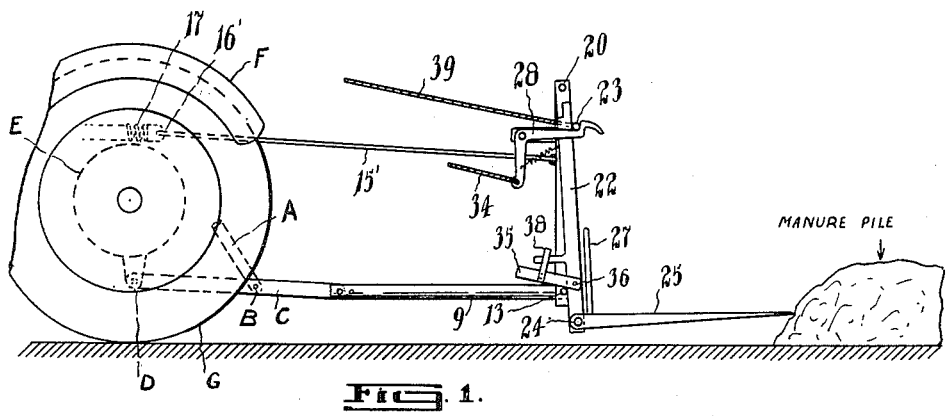
Fig. 1.
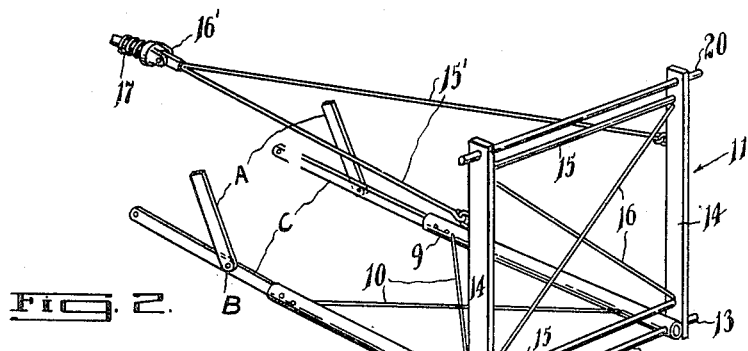
Fig. 2.
Fig. 3.
Fig. 4.
Inventor
Ernest C. Sedore
By Frederick C. Bromley
Atty.

Sept. 16, 1947.    E. C. SEDORE    2,427,575
MANURE LOADER
Filed July 13, 1945    2 Sheets-Sheet 2
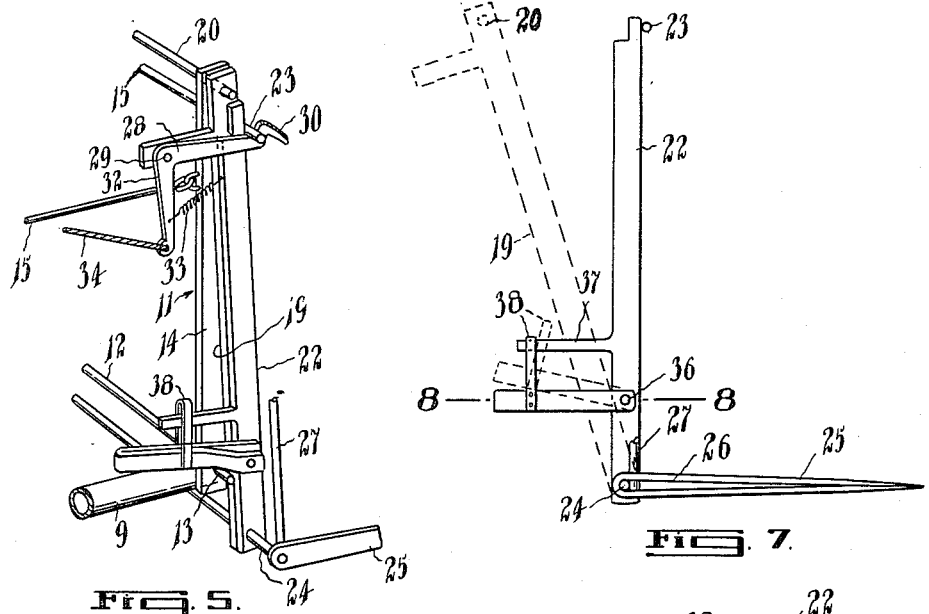
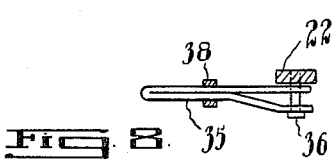
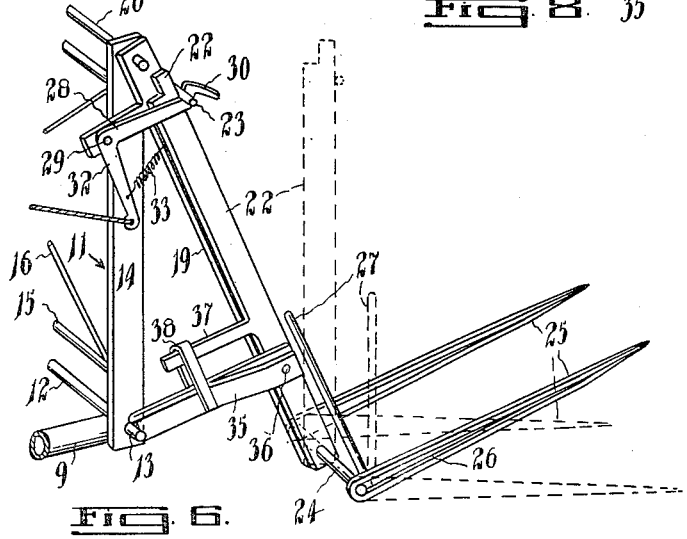
Inventor
Ernest C. Sedore
By Frederick C. Bromley
Atty.

Patented Sept. 16, 1947

2,427,575

UNITED STATES PATENT OFFICE 2,427,575

MANURE LOADER

Ernest C. Sedore, Mount Albert, Ontario, Canada

Application July 13, 1945, Serial No. 604,755

7 Claims. (Cl. 214—140)

My invention relates in general to apparatus for handling material such as manure and particularly concerns a loading implement for use on a farm.

An object of the invention is to provide a loading implement adapted to be carried by a tractor in the nature of an attachment and incorporating a rearwardly directed fork arranged to be driven into a pile of manure by a reverse movement of the tractor and devised to automatically tilt upwardly in a subsequent forward movement of the tractor in a manner such that a mass of the manure is picked up from the pile for loading or other purposes.

A further object is to provide an implement of this character in which the fork can be elevated for dumping its load in a vehicle, and in which the fork is adapted to be tripped for release of the load.

A still further object is to provide an implement of the kind referred to in which the means for elevating the fork is actuated by a known type of mechanism with which a commercialized tractor is equipped so that the implement can be attached to and operated by such a tractor.

A distinctive feature of the invention is that it supplies an implement which is under full control of the person operating the tractor and by which loading and transporting of material can be carried out quickly and easily. It provides a labour saving device which can readily be attached to a tractor when required and therefore does not interfere with the regular use of the tractor at other times. The device is not only highly serviceable and efficient but can be manufactured at a comparatively low cost.

Having set forth the major objects and advantages of the invention, subsidiary objects and advantages will become apparent from the detailed description of the implement illustrated in the accompanying drawings in which:

Fig. 1 is a side elevation of the implement applied to a tractor and depicting it in the act of being driven into a manure pile.

Fig. 2 is a perspective view of the elevating frame.

Fig. 3 is a perspective view of the fork.

Fig. 4 is a similar view of a swing frame which mounts the fork on the elevating frame detailed in Fig. 2.

Fig. 5 is a fractional view in perspective showing the normal position of the fork and frames in which the fork penetrates the manure pile.

Fig. 6 is a similar view but showing the fork in the upward position to which it is tilted as it is withdrawn from the manure pile. In this view the fork is indicated by the dash lines in the act of dumping.

Fig. 7 is a side view of the fork and the swing frame. The latter being represented by the dash lines.

Fig. 8 is a section on line 8—8 of Fig. 7 showing a detent device.

Referring to the drawings in detail, the tractor in association with which my invention is used is of the standard type equipped with drawbar means for elevating a plow or other implement. In prior art developments to which particular reference is had the said means is a hydraulic device comprising a pair of link bars A pivoted at their lower ends B to the drawbars C and likewise connected at their upper ends to the hydraulic mechanism for raising and lowering said drawbars. The mechanism includes a fluid cylinder controlled by the hand lever of a valve which is within convenient reach of the seated driver. The drawbars C are pivoted as at D to rearwardly extend from the rear axle-housing E for connection to the implement. In Fig. 1 the tractor is denoted as a whole by the reference character F and the traction wheels are indicated at G. The elements of the tractor herein illustrated are thought to be sufficient to enable anyone skilled in the art to clearly follow the ensuing detailed disclosure of the present invention.

In carrying out my invention I provide companion bars 9 to form extensions of the arms C which constitute therewith a pair of parallel booms which are suitably connected together as by the struts 10 into a unitary structure for carrying a frame 11 at their distal ends. The bars in the present instance consist of tubular members sleeved on the arms C and pinned thereto. A pintle 12 is arranged to extend transversely through the outer ends of said bars and is made rigid therewith and has its ends projecting outwardly therefrom to form trunnions 13.

The frame 11 is a rectangular member vertically arranged transversely of the booms and comprised of the side bars 14 rigidly tied together as by the crossbars 15 and the struts 16. The lower end of the frame has its side members 14 mounted on the trunnions 13 to turn so that the frame may be retained in a substantially vertical position while the booms are swung up and down on their pivotal connections D.

To maintain said frame in its vertical position the upper parts of the side members thereof are pivotally connected to companion stay rods 15' which converge toward the tractor at an elevation parallel to said booms and terminate in a yoke piece 16' substantially above the forward ends thereof. The yoke piece serves to pivotally attach the stay rods to an element 17 on the axle housing. By this arrangement the booms and the stay rods have parallel movement when the links A are actuated and therefore the main frame 11 is retained in its vertical disposition during raising and lowering movements.

The main frame 11 serves to support a swing frame denoted as a whole by the reference character 18 and detailed in Fig. 4. The swing frame is also of a general rectangular shape and fits loosely over said main frame. It comprises a pair of side bars 19 tied together as by a pintle 20 extending across the same at the top thereof and a crossbar 21 at the bottom thereof. The side bars are spaced to fit at the outside of the main frame 11 and the pintle 20 extends loosely through apertures provided in the upper ends of the side bars 14 aforesaid so as to provide a pivotal connection by which the swing frame is suspended to swing outwardly and rearwardly. The lower ends of the side bars 19 project below the pintle 12 at the rear thereof and normally abut the ends 13 which provide abutments to preclude forward swing of the frame 18 and to retain it at a slight angle as will be best noted from an inspection of Fig. 5.

The fork best shown in Fig. 3, comprises an upright frame from which a series of prongs project rearwardly at right angles thereto to provide a platform on which manure is carried. Said upright frame consists of a pair of side bars 22 rigidly united as by a crossbar 23 at their upper ends and a crossbar 24 at their lower ends. The ends of the crossbar 23 project outwardly of the sidebars. The crossbar 24 secures the fork-prongs, denoted at 25, which are suitably spaced from each other. Said crossbar 24 also serves to fulcrum the fork on the swing frame and for this purpose it is turnably mounted in apertures provided in the lower ends of the side bars 19 thereof. The prongs taper to a point and are apertured at their sides as at 26, and these apertures extend longitudinally on a taper toward the pointed free ends. At the proximal ends of the prongs there is an arrangement of upstanding arms 27 which prevent the material picked up from falling off the front end of the fork.

The fork is retained in its normal horizontal position by means of latches 28 pivoted at 29 on the side bars 19 of the swing frame and provided with inclined free ends 30 having abrupt locking shoulders 31 suited to engage the ends of the upper crossbar 23 aforesaid. The latches have depending levers 32 tensioned by coil springs 33 by which they are retained in engagement with said crossbar 23. Said levers are connected to a lanyard 34 which extends to the tractor so that the operator may operate the latches to trip the fork when the load is required to be dumped.

It will be understood that the fork is free to swing downwardly on its fulcrum 24 when released by the latches and that it is also capable of swinging rearwardly and upwardly in tilting fashion along with the swing frame 18 by means of the fulcrum 20 thereof. Means are supplied to releasably retain both the fork and the swing frame when swung outwardly in this manner so that the tilted position of the fork will prevent the load from dropping from it during elevation or transportation.

The releasable means comprises dogs 35 pivoted at 36 on the lower parts of the side bars 22 to overlie the trunnions 13 and rest thereon. The downward swing of the dogs is limited by a suitable device such as the fingers 37 which rigidly project from the side bars 22 and are loosely engaged by straps 38 rigidly upstanding from the dogs and looped around said fingers. When the fork and the swing frame are swung outwardly in unison on the fulcrum 20 at a sufficient angle the dogs 35 automatically drop so that their free ends will abut the trunnions 13 and thus retain the fork and the swing frame in tilted position.

In the use of the implement its prongs are driven by reverse movement of the tractor into a manure pile with the fork in its normal position as shown in Fig. 1 which causes the prongs to penetrate the material for picking up a load. Then the implement is pulled away from the pile by forward motion of the tractor. The resistance presented by the material to the withdrawal of the prongs causes the fork to automatically swing rearwardly and upwardly and in thus tilting it cants the swing frame 18 along with it by reason of the latch connection therewith. The tilting action pulls the material on the fork away from the pile and the fork is retained in its canted position by the dogs ready for elevation or transportation. Elevational movement is under control of the tractor-operator. The fork can be raised over a receptacle of a vehicle for dumping its load therein. To dump the load the operator merely pulls the lanyard to unlatch the fork which, when freed by the latches 28, swings downwardly on its fulcrum 24 in the dumping operation. Since the frame-bars 22 swing away from the swing frame in the dumping action, this movement serves to raise the dogs 35 clear of the trunnions 13 with the result that the swing frame drops back to its regular position. A flexible element such as a rope 39 is employed to swing the fork upwardly to its regular position for re-engagement by the latches 28. The rope is connected to the crossbar 23 and extended to the tractor. The return movement is assisted by a tension spring 40 having a connection with an element 41 extending radially of the lower bar 24.

It will be manifest from the preceding description that the invention provides a loading apparatus operable by the tractor to which it is attached for carrying out loading operations and one which is simple to operate and highly serviceable in use.

It will be understood that the invention, although disclosed in one practical form, may be modified in details of the construction and arrangement of its parts as come within the spirit and scope of the appended claims.

What I claim is:

1. A manure loader comprising a boom structure adapted to be attached to a tractor for operation thereby, a swing frame suspended on said boom structure for rearward movement, a fork fulcrumed on the lower end of said swing frame with its prongs rearwardly projecting from the fulcrum-axis, said fork including frame pieces extending upwardly from the fulcrum-axis alongside of said swing frame, latches on said swing frame engaged with said frame pieces to lock the fork thereto, manual actuating means for the latches, dogs pivoted on said frame pieces of the fork for engaging said boom structure for retaining said swing frame displaced by rearward movement, and means for causing said dogs to be automatically released when the fork turns downwardly on its fulcrum in the tripping of the latches.

2. In an apparatus of the kind described for use with a tractor, a main frame for supporting attachment on the tractor, a vertical frame pivotally connected at its upper end to said main frame and normally depending from said pivotal connection, an abutment engaging the swing frame to constrain it against backward swing but leaving it free to swing forwardly away from the main frame, a fork or scoop having a material-receiving surface extending forwardly from its rear end to the open or front end, said fork or scoop being rearwardly attached to the lower end of said swing frame, the attachment operating to retain the fork or scoop in substantially horizontal disposition so that it may be driven into a pile of material by movement of the tractor whereby the fork or scoop, in withdrawing from the pile in a reverse movement of the tractor, causes the swing frame to automatically swing to an outwardly inclined position accompanied by an upward tilt of the fork or scoop, and disengageable means for retaining the swing frame in its outwardly inclined position.

3. An apparatus as set forth in claim 2, in which the main frame is an erectile member pivotally mounted on the free end of a boom elevated by a hydraulic lift mechanism common to a tractor, and in which said main frame is maintained in erectile disposition by means of a parallel-motion mechanism.

4. An apparatus as set forth in claim 2, in which said abutment comprises a stop piece on the main frame which forms a thrust face for abutting the swing frame.

5. An apparatus as set forth in claim 2, in which the fork comprises tines extending forwardly from a transverse rear member having upstanding elements forming a back part for the fork.

6. An apparatus as set forth in claim 2, in which the fork or scoop is rearwardly pivoted to the swing frame to swing vertically, and in which a trip mechanism is provided to retain the fork in substantially horizontal disposition.

7. A manure loader comprising a boom structure adapted to be attached to a tractor for operation thereby, an upright main frame included in the boom structure and vertically retained at the free end thereof, an upright frame pivotally connected at its upper end to said main frame and normally depending from its pivotal connection, an abutment engaging the swing frame to constrain it against backward swing but leaving it free to swing forwardly away from the main frame, a fork having tines extending forwardly from its rear end to its front end, said fork being pivoted at its rear end to the lower end of said swing frame so that its front end may swing vertically, latching means precluding the fork from turning on its pivotal connection with the swing frame and operating to retain the fork in substantially horizontal disposition for entering a pile of manure in the movement of the tractor in one direction whereby the fork, in withdrawing from the pile in a reverse movement of the tractor, causes the swing frame to swing to a forwardly inclined position accompanied by an upward tilt of the fork, and disengageable means for retaining the swing frame in its forwardly inclined position.

ERNEST C. SEDORE.

REFERENCES CITED

The following references are of record in the file of this patent:

UNITED STATES PATENTS

| Number | Name | Date |
| --- | --- | --- |
| 1,500,104 | Carlberg | July 8, 1924 |
| 2,242,982 | Schuttloffel et al. | May 20, 1941 |
| 2,254,292 | Jones | Sept. 2, 1941 |
| 2,311,671 | Larsen | Feb. 23, 1943 |
| 2,313,534 | Gledhill | Mar. 9, 1943 |
| 2,330,847 | Seal | Oct. 5, 1943 |
| 2,357,954 | Johnson | Sept. 12, 1944 |
| 2,394,458 | Lull | Feb. 5, 1946 |
| 2,398,585 | Hayward | Apr. 16, 1946 |
| 2,401,159 | Hunter | May 28, 1946 |